United States Patent [19]
Richardson et al.

[11] Patent Number: 5,852,535
[45] Date of Patent: Dec. 22, 1998

[54] ACCURATE MEASUREMENT OF PREFORMATTED TRACK SERVO PATTERNS BY A MAGNETIC DATA TAPE DRIVE

[75] Inventors: Kenneth G. Richardson, Fort Collins; Mark Millican, Boulder; Erik Habbinga, Longmont; Mark E. Mills; Stephen G. Uhlmann, both of Loveland; Mark E. Nash, Lyons, all of Colo.

[73] Assignee: Hewlett-Packard Company, Palo Alto, Calif.

[21] Appl. No.: 609,254

[22] Filed: Feb. 29, 1996

[51] Int. Cl.$^6$ .............................. G11B 5/584; G11B 5/02
[52] U.S. Cl. .......................................... 360/77.12; 360/67
[58] Field of Search .................... 360/48, 77.08, 360/77.12, 77.14, 67

[56] References Cited

U.S. PATENT DOCUMENTS

| | | | |
|---|---|---|---|
| 5,319,508 | 6/1994 | Tsunoda et al. | 360/67 |
| 5,418,670 | 5/1995 | McClure et al. | 360/77.12 |
| 5,442,299 | 8/1995 | Emori | 360/48 |
| 5,453,888 | 9/1995 | Tsunoda et al. | 360/77.08 |
| 5,617,269 | 4/1997 | Gordenker et al. | 360/77.12 |

*Primary Examiner*—W. R. Young
*Assistant Examiner*—Regina Y. Neal
*Attorney, Agent, or Firm*—Augustus W. Winfield

[57] ABSTRACT

A method for reliably measuring preformatted servo patterns, on a magnetic tape, for positioning a magnetic head. The tape has constant frequency stripes marking servo pattern areas. The drive reading the preformatted tape has a read channel amplifier with automatic gain control (AGC). When a stripe is detected, AGC is enabled. Before leaving a stripe, AGC is placed on hold. The amplitudes of two servo bursts are then measured with a gain that has been calibrated by a signal from a stripe. During the time AGC is enabled, the amplifier peak output is limited to less than half the maximum amplifier peak output. The servo pattern signal amplitude is about twice the signal amplitude of a stripe, so that servo patterns are measured with almost the maximum signal-to-noise ratio. When a stripe is detected, a counter counts pulses resulting from the stripe signal, for a fixed time, to ensure that the stripe detection is valid. If the stripe is qualified, the servo pattern measurements are used for head alignment adjustment. If the strip is not qualified, the servo pattern measurements are discarded.

2 Claims, 4 Drawing Sheets

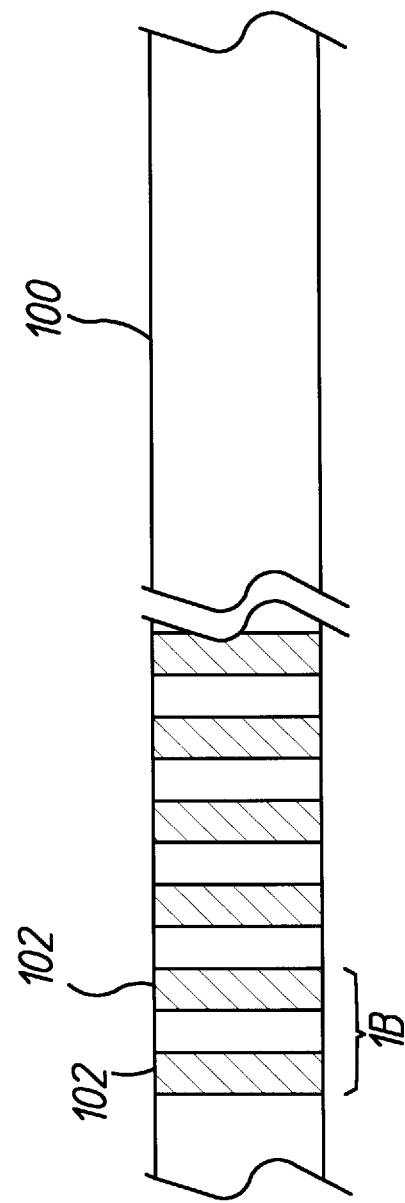

ACCURATE MEASUREMENT OF PREFORMATTED TRACK SERVO PATTERNS BY A MAGNETIC DATA TAPE DRIVE

FIELD OF INVENTION

This invention relates generally to magnetic data storage and more specifically to a method to ensure accurate measurement of preformatted servo information on magnetic data tapes.

BACKGROUND OF THE INVENTION

For low cost magnetic tapes used for data recording, one common format has longitudinal tracks written by drives that have a moveable magnetic head having one read/write gap which is stepped from track to track. In some products, blank tapes may be formatted by drives. As track densities increase, it is becoming common for tapes to be preformatted by the tape manufacturer. FIGS. 1A (prior art) and 1B (prior art) illustrate part of a longitudinal track format which is used for a particular class of preformatted magnetic data tapes in the personal computer industry. FIGS. 1A and 1B are based on the QIC-170 specification. Further information on the format illustrated in FIGS. 1A and 1B may be found in *Preformatted Magnetic Travan Minicartridge For Information Interchange*, available from Quarter-Inch Cartridge Drive Standards, Inc., 311 East Carrillo Street, Santa Barbara, Calif. 93101.

In FIG. 1A, a tape 100 has multiple formatted stripes 102 written across the full width of the tape at each end of the tape. Each stripe 102 is a single frequency of flux transitions marking the boundaries of preformatted track servo information. FIG 1B is an expanded view of part of two stripes 102 with additional detail of track servo patterns recorded between the stripes. The track servo pattern contains "A-Bursts" (104, 110) and "B-Bursts" (106, 112). A track centerline (108, 114, 116) is defined by adjacent edges of one A-Burst and one B-Burst. For example, a track centerline designated by reference number 108 is defined by an edge of A-Burst 104 and an adjacent edge of B-Burst 106. Similarly, track centerline 114 is defined by bursts 110 and 106 and centerline 116 is defined by bursts 110 and 112.

The tape drive must first find one end of the tape by detecting beginning-of tape or end-of-tape holes (not illustrated). Then, the tape drive must sequentially detect stripes 102 and the following servo bursts. The drive may then measure the read signal amplitude from two consecutive servo bursts and adjust the head position until the read signal amplitude from two consecutive servo bursts is equal, indicating that the head is centered along the line between two servo bursts. Typically, the drive reads multiple A and B burst patterns, averaging the peak A-burst amplitudes and averaging the peak B-burst amplitudes and adjusting the head position based on averaged peak amplitude values. The stripes and servo bursts could be detected with a fixed gain amplifier. However, there may be variations in components such as heads and amplifiers, variations in signal amplitude from tape to tape, and variations in signal amplitude along any particular tape. Therefore, with a fixed gain, the signal-to-noise ratio may vary substantially for measurement of the amplitudes of the servo bursts. In general, when a signal amplitude must be measured, as is required for the servo bursts, it is preferable to adjust amplifier gain to optimize the signal-to-noise ratio. However, for meaningful measurement of peak amplitudes within a burst, the amplitudes of the servo bursts must be measured with a fixed gain. There is need for some adjustment of amplifier gain to compensate for system variations but the servo bursts must be measured with fixed gain. If an amplifier with automatic gain control (AGC) always has AGC active before stripe detection, circuitry for detecting a stripe might trigger on noise. In addition, because of signal frequency as discussed in more detail later, the signal amplitude from a stripe is substantially lower than the signal amplitude from a servo burst. Therefore, the gain after reading a stripe may be too high and the amplitude of a signal from a subsequent servo burst may saturate the amplifier, resulting in an inaccurate amplitude measurement of the servo burst.

There is a need for adjustment of amplifier gain in a manner that enables reliable detection of the stripes and accurate measurement of the servo bursts.

SUMMARY OF THE INVENTION

Amplifier gain is calibrated during reading of a stripe by enabling AGC when a stripe is detected. Because of differences in amplitude between signals from a stripe and signals from a servo burst, the AGC voltage set point during stripe reading is less than the AGC voltage set point that would normally be used for a full range signal from a servo burst. After a fixed time delay, before reaching a servo burst, AGC is placed in a hold mode. During the same delay, a counter counts pulses resulting from the stripe signal to see if the stripe detection was valid. If the expected number of pulses is received, the amplitudes of two servo bursts are measured and the results are used to adjust head alignment. If the stripe detection is not qualified (expected number of pulses not received), the controller resumes searching for another stripe.

BRIEF DESCRIPTION OF THE DRAWINGS

FIG. 1A (prior art) is a plane view of a preformatted magnetic tape.

DETAILED DESCRIPTION OF THE PREFERRED EMBODIMENT OF THE INVENTION

Figure 2:
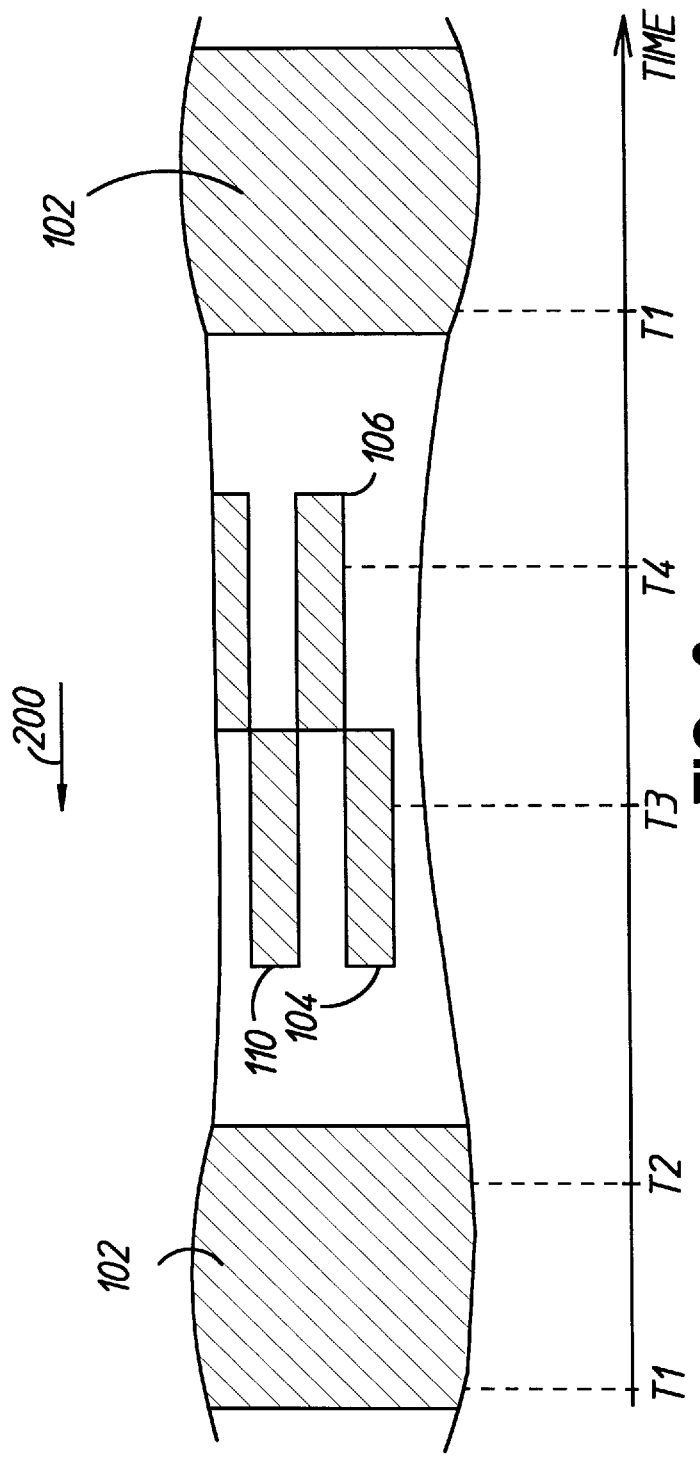
FIG. 2 is a detailed view of part of a tape as in FIG. 1B with identification of times of events in accordance with the invention.

FIG. 2 illustrates some events of interest to the invention, depicted as a time line with corresponding physical locations on the tape. In FIG. 2, the tape is moving in the direction depicted by arrow 200 past a stationary magnetic head. To detect the first stripe, a read channel amplifier AGC is enabled. The AGC set voltage is set to about half of the normal value for a full range signal. When the first stripe is detected, AGC is placed in hold mode and the system searches for another stripe. For all stripes after the first detected stripe, stripes are detected with AGC in hold mode to reduce triggering on noise. At time T1, a stripe is detected. When a stripe is detected, AGC is enabled and the amplifier gain automatically adjusts to the signal amplitude of the stripe. Stripe detection at time T1 is still somewhat subject to noise so that a false detect is possible. To further ensure reliability, starting at time T1, a counter counts pulses resulting from passing the stripe signal through the read channel. Also at time T1, a timer is started to determine time T2. At time T2, if the number of pulses counted by the counter falls within a predetermined range, the stripe detect at time T1 is qualified as valid. At time T2, before reaching a servo burst, the amplifier AGC is placed in hold mode for measurement of servo burst amplitude. Recall that the set point voltage is about half of the normal set point voltage. However, the amplitude of a signal from a stripe is about half of the amplitude of a signal from a servo burst, so the signal level from a servo burst then results in a full-range signal. If the stripe detect is qualified as valid, the amplitudes of the signals from two servo bursts are measured at times T3 and T4. T3 and T4 are placed about ⅔ to ¾ of the overall time for a burst from the beginning of a burst to give a peak detector time to accurately determine the peak voltage. As a result of the preceding steps, the amplitudes of the signals from the two servo bursts are measured with close to a maximum signal-to-noise ratio, even with low signal amplitude or variation in components and tape.

Figure 3:
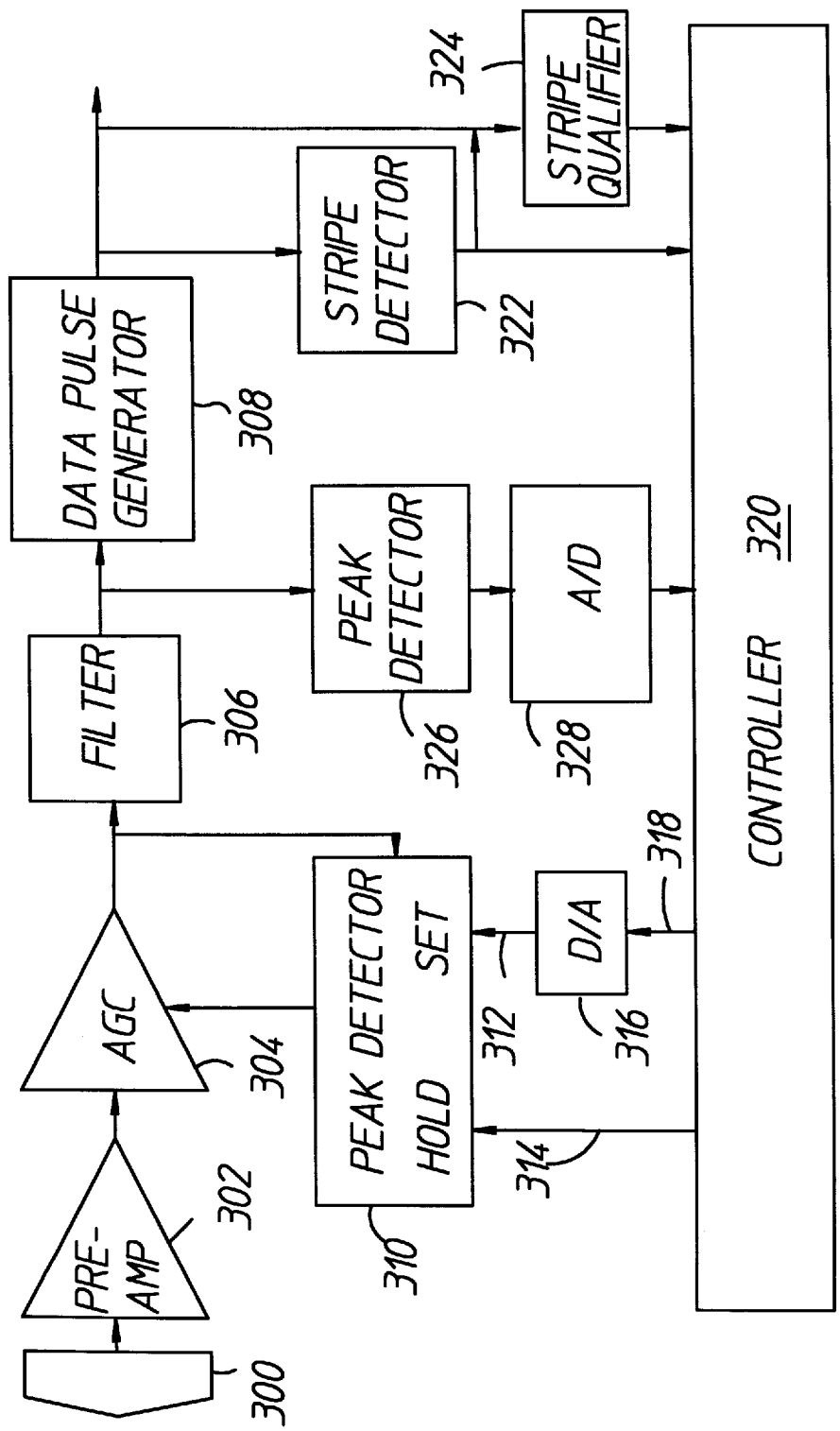
FIG. 3 is a block diagram schematic of part of a read channel for a tape drive in accordance with the invention.

FIG. 3 illustrates the read channel electronics for a tape drive designed to generate the event times illustrated in FIG. 2 and to make the necessary measurements. A signal from a magnetic head 300 goes to a preamplifier 302, followed by an AGC amplifier 304, followed by a low-pass noise filter 306. The AGC amplifier 304 operates in conjunction with a peak detector circuit 310. The peak detector circuit 310 has two control inputs of interest, a set-voltage control signal 312 and a hold signal 314. The peak detector compares the peak-to-peak output of the AGC amplifier 304 to the set-voltage control input 312. With a gain factor, if the peak-to-peak output of amplifier 304 exceeds the set-voltage control input 312, the gain of amplifier 304 is reduced, and if the peak-to-peak output of amplifier 304 is less than the set-voltage control input 312, the gain of amplifier 304 is increased. If the hold signal 314 is asserted, the gain of amplifier 304 is held constant at whatever the gain is at the time the hold signal 314 is asserted.

A microprocessor based controller 320 provides a digital representation 318 of a voltage to a digital-to-analog (D/A) converter 316, which in turn drives the set.voltage control signal 312 to the peak detector 310. The D/A 316 may be a resistor ladder arrangement, in which case the digital voltage representation 318 from the controller 320 is a multiple bit binary number. Alternatively, the controller 320 can provide a pulse width modulated serial signal, in which case the D/A 316 is a simple low-pass filter.

Data pulse generator 308 is part of a typical magnetic recording data separator. The data pulse generator differentiates the signal from the filter 306, detects qualified zero crossings in the differentiated signal, and outputs a series of pulses, where each output pulse corresponds to a peak in the signal from the head 300. From the output of filter 306, a second peak detector 326 goes to an analog-to-digital (A/D) converter 328.

Figure 1B:
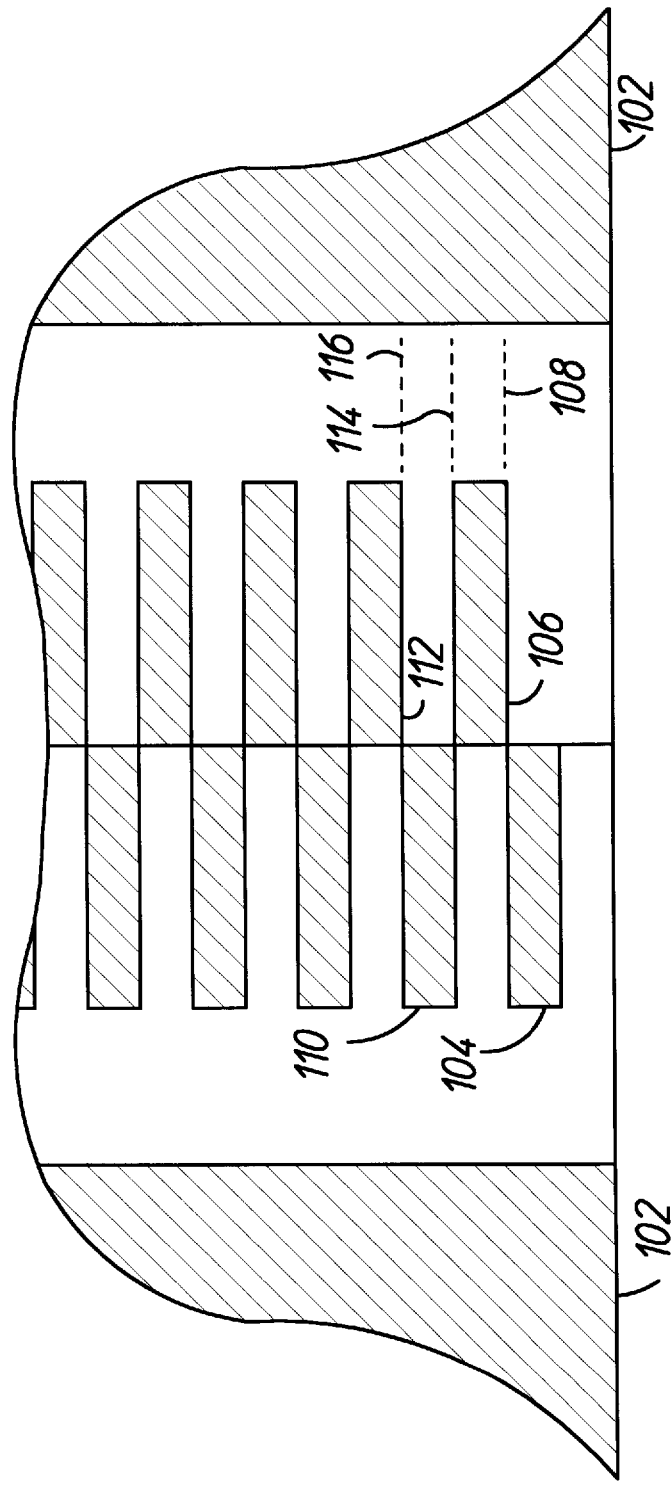
FIG. 1B (prior art) is a detailed view of part of the tape of FIG. 1A.

Referring back to FIGS. 1A and 1B, each stripe 102 has a uniform density of 15,000 flux transitions per inch (590.55 flux transitions per millimeter). Each stripe is 0.02 inches (0.508 mm) long, resulting in approximately 300 total flux transitions. Each servo burst (104, 106, 110, 112) has a uniform density of 7,500 flux transitions per inch (295.28 flux transitions per millimeter). Referring again to FIG. 3, stripe detector 322 counts consecutive pulses from the output of the data pulse generator 308 during a predetermined time interval. The time between pulses for the stripes and servo bursts depends on tape speed. If 9–12 consecutive pulses are counted during the time interval appropriate to the tape speed, the stripe detector signals the controller 320, and a stripe qualifier 324, to indicate that a stripe has apparently been detected (FIG. 2, T1). When the stripe detector indicates the presence of a stripe, the controller removes the hold signal 314, activating AGC for AGC amplifier 304. The controller 320 waits for a fixed amount of time sufficiently long for the gain to adjust to the amplitude of the stripe signal, and then asserts the hold signal 314 (FIG. 2, T2). The time from T1 to T2 is dependent on tape speed but an example is 240 microseconds for a commonly used speed. Note that the hold signal 314 is asserted while the head is still reading flux transitions from a stripe.

Starting at the time the stripe detector indicates the presence of a stripe (FIG. 2, T1), the controller waits a first fixed time (dependent on tape speed) to read the magnitude of a first servo burst (FIG. 2, T3) as measured by peak detector 326 and A/D 328 and waits a second fixed time to read the magnitude of a second servo burst (FIG. 2, T4).

Also starting at T1 (the time the stripe detector indicates the presence of a stripe), the stripe qualifier 324 starts counting pulses resulting from the assumed stripe signal. At time T2, the value of the counter is read. If the counter counts the proper number of pulses, within a predetermined range based on timing and tape speed tolerances, the stripe detect at T1 is qualified. If the stripe detect is qualified, the magnitudes of the next two servo bursts are measured by peak detector 326 and A/D 328 and are used (part of a set of averaged amplitudes) for head position adjustment. If the stripe detect is not qualified, the A/D measurements are discarded (not included in the average).

Amplifier 304 has a specified maximum unsaturated output. Filter 306 may have a specified distortion only for signals within a specified signal amplitude range. A/D 328 has a specified range such that a specified maximum input voltage will result in a maximum (full-range) digital output. In general, for maximum signal-to-noise ratio for measuring a servo burst, the gain of amplifier 304 should be such that the maximum expected amplified peak signal from a servo burst will result in the maximum output of amplifier 304, the maximum range for filter 306, or the maximum input of A/D 328, whichever is smaller. In a specific embodiment, the specified maximum input for A/D 328 is greater than the specified maximum output of amplifier 304 because the A/D 328 is also used for other system measurements. In that same specific embodiment, maximum channel amplitude is limited by the filter 306. Therefore, in the specific embodiment, the maximum signal-to-noise ratio is limited by the range of filter 306. Before the first stripe is detected, the set-voltage control signal 312 is set to a voltage that results in an amplifier peak-to-peak output that is about 40% of the specified maximum channel voltage. Recall from the above discussion that the frequency of the signal from a stripe is twice the frequency of the signal from a servo burst. The amplitude of the signal from the head decreases with increasing signal frequency. If, for a particular gain, the signal from a stripe results in an amplifier output that is half the maximum specified output voltage, the signal from a servo burst, at the same gain, will result in the maximum channel voltage. Therefore, the gain of amplifier 304 at time T2 (FIG. 2) results in almost a maximum signal-to-ratio for servo signal measurement, leaving some margin to prevent amplifier saturation due to noise.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of reading a servo pattern on a magnetic tape drive, the method comprising the following steps:

(a) detecting, by a controller, a stripe pattern on the magnetic tape, the stripe pattern used to mark a location of the servo pattern;

(b) enabling, by the controller, automatic gain control on an amplifier receiving a signal read from the stripe pattern;

(c) waiting for a time period sufficient for the amplifier gain to adjust to the signal read from the stripe pattern;

(d) counting pulses resulting from the signal read from the stripe pattern, during the period of waiting in step (c); and (e) using a subsequent positioning servo pattern for positioning only if a predetermined number of pulses are counted in step (d).

2. The method of claim 1 further comprising:

setting a maximum amplifier output voltage, during step (c), such that a maximum expected signal amplitude read from the subsequent positioning servo pattern will result in a predetermined maximum voltage.

* * * * *